Jan. 4, 1927. 1,613,127
C. REYNERI
SPOKED WHEEL CONSTRUCTED OF PRESSED OR STAMPED METAL SHEETS
Filed Nov. 30, 1925

Inventor
Carlo Reyneri,
By
Atty.

Patented Jan. 4, 1927.

1,613,127

UNITED STATES PATENT OFFICE.

CARLO REYNERI, OF TURIN, ITALY.

SPOKED WHEEL CONSTRUCTED OF PRESSED OR STAMPED METAL SHEETS.

Application filed November 30, 1925, Serial No. 72,163, and in Italy December 6, 1924.

This invention has for its object new and useful improvements in the construction of spoked wheels of pressed or stamped metal sheets and consists of strengthening means by which the wheel is made strong and light and can be easily and cheaply assembled, finished and finally trued up.

Said strengthening means consist of a spider of stamped sheet metal made in two parts brought together inside the wheel in such a way as to strengthen the hub and a portion of the spokes. The two parts of the spider are provided with inner bushes fitted on the ends of the tubes through which pass the attachment bolts of the wheels, while corresponding bushes also directed inwardly are provided on the half wheels and slipped into the opposite ends of said tubes.

Moreover the felly is of a particular form, so that it can be electrically welded to the rim and contributes to render the wheel lighter, more resilient and of cheaper construction than the ordinary spoked wheels.

A wheel constructed in accordance with this invention shows further the advantage that, its parts being electrically instead of autogeneously welded together, will not undergo any deformation during the fitting of the rim and the connection will be even and sure and will not require any finishing, this resulting in an economical advantage.

The annexed drawings show by way of example a constructional form of the wheel.

Figure 1:
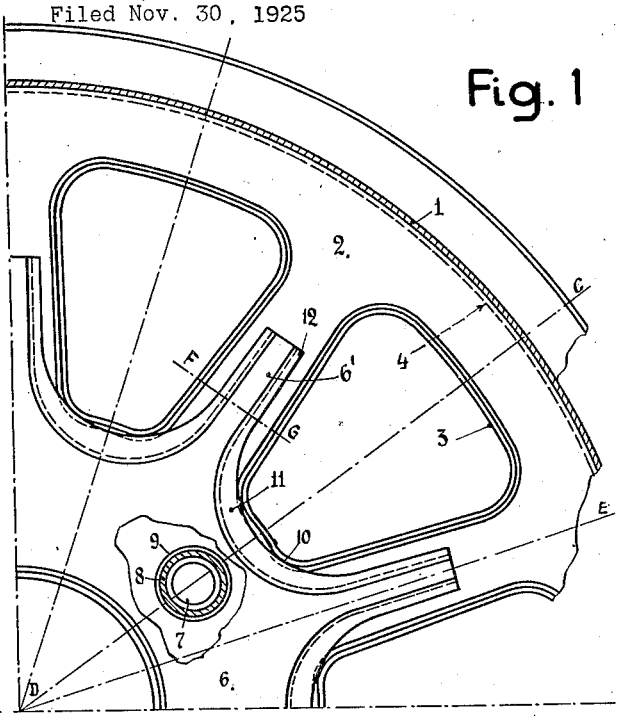
Fig. 1 is a partial front view sectioned on line A—B of Fig. 2.

Referring to the drawings, 1 denotes the wheel rim, 2 and 2' the two halves forming the wheel body soldered together along the flanged edges 3 and provided at their periphery with annular edges 4 projecting outwardly on which rests the rim 1.

The annular edge 4 will be conveniently bevelled as indicated by 5 on the drawing.

The two halves of the wheel body enclose a spider 6.6' also constituted by two halves of stamped sheet metal.

Figure 2:
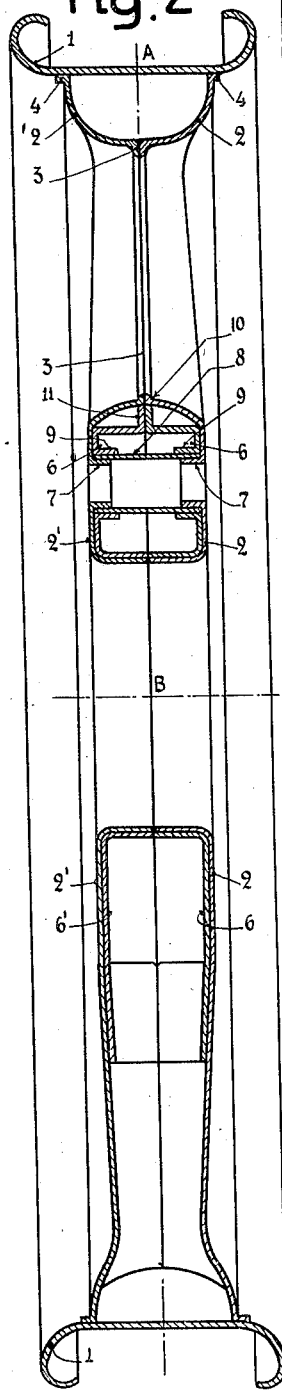
Fig. 2 is a cross section on line C—D—E of Fig. 1.

On the two halves of the wheel body are formed the bushes 7 (Fig. 2), which are pressed in a conical form and then made cylindrical after assemblage and welding of the said two halves.

The bushes 7 are connected through tubular cross pieces 8 mounted thereon and on which are fitted bushes 9, similar to bushes 7, formed on the two halves of the spider 6.6'.

The hub of the spider 6.6' fits with its inner periphery exactly on the inner face of the hub of the wheel body and at its outer periphery it is provided with edges 11 extending as far as the periphery 10 of the hub of the wheel body forming a strong rib.

Figure 3:
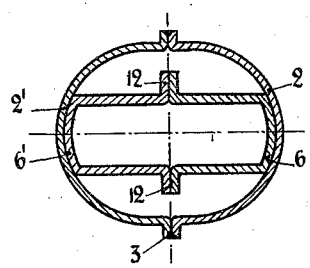
Fig. 3 is on an enlarged scale a cross section of a spoke on line F—G of Fig. 1.
Figure 4:
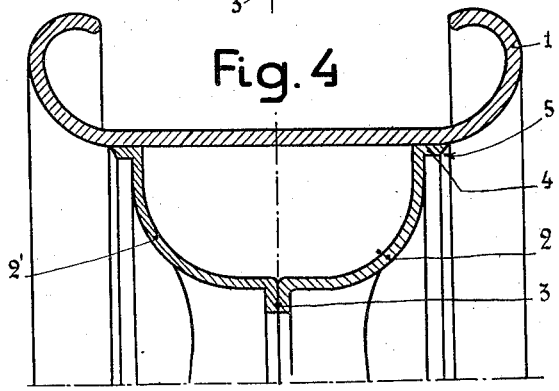
Fig. 4 shows on an enlarged scale a detail of the connection between felly and rim.

The spokes of the spider 6.6' project into the spokes of the wheel body 2.2' for a length that varies according to each particular case, their width in the connection plane being somewhat smaller than that of the wheel spokes. Said spokes 6.6' are provided with edges 12 (Figs. 1 and 3) constituting an extension of the edges 11; in the plane perpendicular to the connection plane their width corresponds to the internal width of the spokes against the walls of which they rest.

The assemblage of this wheel will be conveniently effected in the following manner:

The cross piece 8 and one half-spider 6 are fitted in the half wheel 2 conveniently arranged. The half-spider 6' is then mounted on the half-spider 6 and then the half wheel 2', the bushes 7 of which fit into the cross pieces 8.

Having thus effected a preliminary assemblage of the wheel, the welding will be carried on along the edge 3 and then the rim is fitted on the wheel body and welded thereon as described while the bushes 7 will be made cylindrical by means of suitable pins in a final operation of trueing the different wheel pieces by means of a press.

The length of the spider 6.6' and the thickness of the metal sheet will be chosen in each case according to the required strengthening action.

What I claim is:

1. Improvements in spoked wheels constructed of pressed or stamped metal sheets, characterized by a strengthening spider constituted by two halves of pressed sheet metal enclosed in the two halves of the wheel body in correspondence with the hub and the spoke portion adjacent to said hub.

2. A spoked wheel comprising two halves constructed of pressed or stamped sheet metal and a strengthening spider composed of two halves of pressed sheet steel enclosed in the two halves of the wheel body and corresponding with the hub and the spoke portion adjacent to said hub.

3. A spoked wheel comprising two halves constructed of pressed or stamped sheet metal, a strengthening spider comprising a hub portion which fits with its inner periphery on the inner face of the wheel body and at its outer periphery being provided with supporting flanges forming a rib between the periphery of the spider and the periphery of the wheel hub, and spokes provided in the connection plane with supporting flanges constituting extensions of the aforesaid flanges and bearing perpendicularly to said plane against the inner walls of the spokes of the wheel body.

4. A spoked wheel comprising two halves constructed of pressed or stamped sheet metal, a strengthening spider constituted by two halves of pressed sheet metal enclosed in the two halves of the wheel body, tubes for the reception of connecting bolts, openings in the hub portion of the wheel having flanges fitted into the ends of said tubes, and openings in the hub portion of said spider having flanges surrounding the ends of said tubes.

In testimony that I claim the foregoing as my invention, I have signed my name.

CARLO REYNERI.